United States Patent Office 3,690,932
Patented Sept. 12, 1972

3,690,932
METHOD FOR PRODUCING MIXED LAYERS FROM INORGANIC AND ORGANIC SUBSTANCES ON A SUBSTRATE
Walter Geffcken and Volker Paquet, Mainz, Germany, assignors to JENAer Glaswerk Schott & Gen., Mainz, Germany
Filed Nov. 14, 1969, Ser. No. 876,945
Claims priority, application Germany, Nov. 20, 1968, P 18 09 906.4; Oct. 28, 1969, P 19 54 083.1
Int. Cl. C23c *11/00, 17/00*
U.S. Cl. 117—106 R           20 Claims

ABSTRACT OF THE DISCLOSURE

Mixed layers of inorganic and organic substances are produced by vaporization of these substances in a high vacuum chamber and precipitating these vaporized substances on a substrate, such as a plate of synthetic material or chemically sensitive optical glass. The mixed layer so formed serves as a durable coating protecting the substrate effectively against detrimental chemical and mechanical influences.

---

The invention relates to a method for the production of mixed layers from inorganic and organic substances by means of vaporization in high vacuum and precipitation on a substrate.

For many purposes, the known layers produced from inorganic vaporized substances, for example, fluorides or oxides soluble with difficulty, possess certain disturbing characteristics. For example, they are mostly very brittle, so that a layer of more than $3\mu$ thickness tends to peel or chip off. Frequently the layer develops small cracks which make their use as protective layers against corrosion and for other purposes questionable.

Particular difficulties occur if it is desired to apply such layers as mechanical protection to surfaces made of synthetic material. Here a satisfactory adherence of the layer requires expensive preparations such as previous shellacking with special lacquers and the like, and still failures are frequent on account of the unavoidable fluctuaton in the conditions of production of the synthetic materials.

The object of the present invention is a method for the production of mixed layers from inorganic and organic substances by means of vaporization in high vacuum and precipitation on a substrate, which method is more flexible and produces better adhering layers than is possible with the pure inorganic substances.

This object is attained in accordance with the invention in that the vapor of a polymerizable organic substance is introduced into the vacuum chamber, while in the vacuum chamber, by means of more or less strong throttling of the gas current, a partial pressure of the organic substance is maintained, which lies between $10^{-4}$ to $10^{-2}$ torr, and that the inorganic substance in the ordinary manner is evaporated by means of thermic vaporization, electron-bombardment or sputtering. This has a result that due to getter effect a noticable portion of the organic substance is bound in the vaporized layer. The partial pressures of other gases such as $O_2$ or $N_2$ lie suitably below $10^{-3}$ torr.

When practicing the method in accordance with the invention, this evaporation according to the conventional method may take place by means of heating in a small shuttle of vaporizable substances by means of electron-bombardment. Also the so-called sputtering-method is utilizable. The vaporized inorganic substance does not precipitate in pure form on the substrate, but the vaporized layers contain thanks to their getter effect on the organic vapors considerable quantities of organic substances. This effect is particularly significant upon the vaporization of high-$SiO_2$-containing substances on account of the high capability of absorption of the $SiO_2$ of organic substances.

According to the method it is simplest, if the organic substance is brought outside of the vacuum-bell into a suitably evacuated container.

The invention will be described more in detail on the basis of the drawings.

Figure 1:
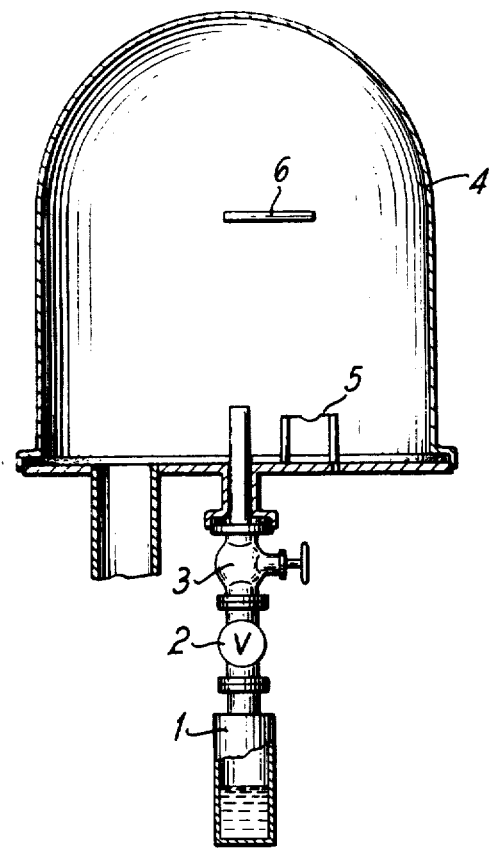
Figure 3:
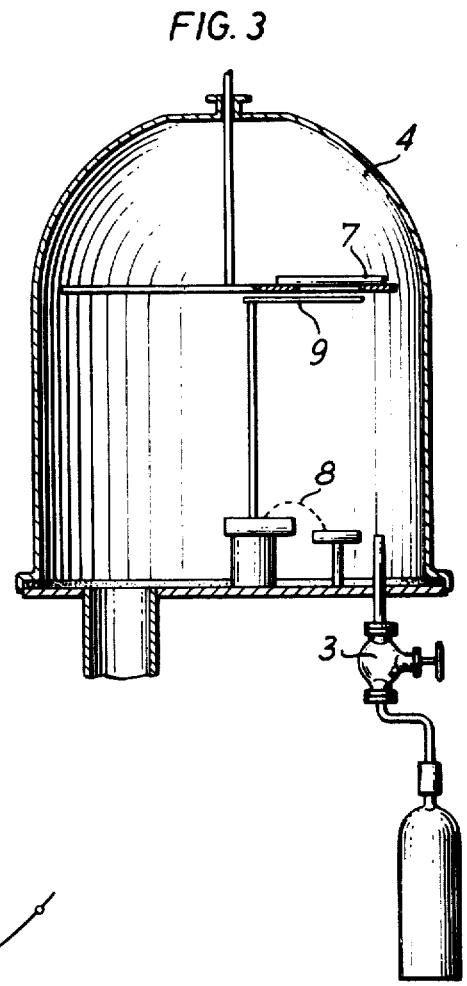
Figure 2:
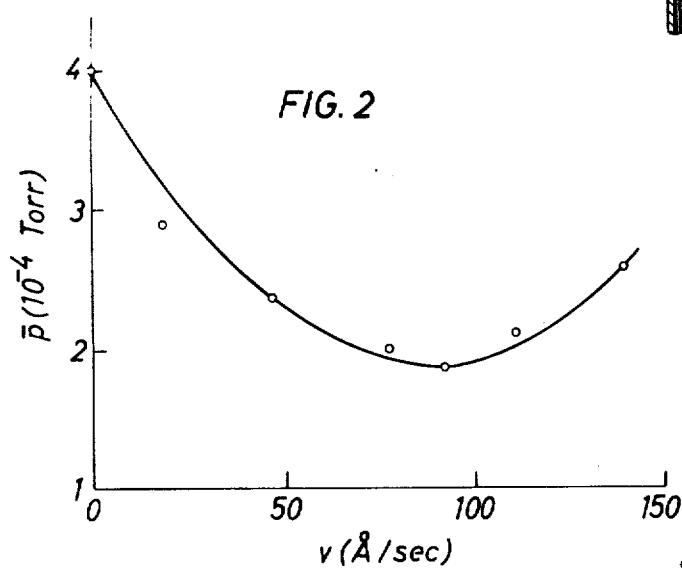

In the drawings:
FIGS. 1 and 3 show by way of example, each a different device for practicing of the method, and
FIG. 2 shows a graphic illustration of the rate of vaporization $v$ (A./sec.) in relation to the total pressure $p$ in $10^{-4}$ torr units.

Referring to the drawing, FIG. 1 discloses a vessel 1 which contains several cc. of an organic substance, for example, methylmethacrylate, Its vapor pressure is already at room temperature more than 20 torr. Over the valve 2 the vessel may be connected to a pump, which is able to produce several tenths of torr as an end vacuum. Thereby, the ester comes to cooking, and disturbing permanent gases are removed and the entire gas chamber is filled solely with the organic vapor. The rest of the conduit is over the needle valve 3 brought to a high vacuum. After closure of the valve 2, the needle valve 3 is opened so far that on account of the organic vapor flowing from the vessel 1 into the receptacle 4, a partial pressure of the organic substance of at least $10^{-4}$ is produced, preferably about $10^{-3}$ torr. If subsequently a vaporization of an inorganic substance takes place in the receptacle 4 by means of the source of vaporization 5, the pressure in the receptacle drops greatly. The precipitation of the mixed layer takes place on the substrate 6. This shows that the organic substance is greatly gettered by means of the vaporized inorganic substance during formation of a mixed layer.

Likewise utilizable, although less easily dosageable, is a method in which a substance whose vapor pressure is relatively low at room temperature, is carefully heated. This heating may lead to a simple vaporization. It may, however, also lead as with polystyrene, to a depolymerization, so that in the gas chamber preferably the nonomeric styrene is present. Still it is not in all cases necessary to utilize solely monomeric vapors.

Frequently also dimers or still somewhat higher polymers are sufficiently volatile. Therefore, the present method includes also such low polymers even if at the same time their use does not have in the main any special advantages.

It is technically most advantageous when the substance has not too small a vapor pressure at room temperature. If the pressure exceeds 0.1 torr at room temperature, one may dispense with any additional heating devices.

For the selection of the inorganic substance there exists a great leeway. It may be a non-metal, for example, one of the known fluorides soluble with difficulty, such as $MgF_2$, $ThF_4$. Particularly favorable results are obtained with $SiO_2$ or its combinations. Here the vaporization is carried out best by means of electron bombardment with the so-called electron-gun. As combinations of $SiO_2$, particularly suitable glasses give good results.

Although the polymerization of the gettered organic substance, mainly already of itself, probably on account of the numerous active centers of vaporized inorganic substances takes place in statu nascendi, this effect may be supported in more complicated cases by means of known means, such as through UV-radiation or by means of the effect of active oxygen, such as it occurs with a glow discharge. This may take place during or after the vaporization.

For the acceleration during the vaporization, there may be added at the same time, with the organic polymerizable substance the vapors of sufficiently volatile catalysts, such as benzoin.

For the production of semi-conductive characteristics, frequently a partial reduction of the inorganic substance is necessary. The gettered organic substance may also assume such a role.

A particularly important object of the layers produced in accordance with the invention is their use as adhesion-imparter for predominantly inoragnic coatings on synthetic materials. As is known, it is very difficult with vaporization operations to accomplish a sufficiently intimate contact of an inorganic or an oragnic layer. If one does not employ particularly expensive procedures, the layers in most cases peel or chip off. In contrast thereto, the coatings in accordance with the invention adhere very securely. For example, upon an increased subsequent heating of a coated synthetic material it is true that there occurs due to the highly varying heat expansion, a tearing of the layer into smaller areas. The latter, however, no longer peel or chip off from the base member.

Particularly interesting are such layers which contain more than 50 percent by volume of an inorganic substance, which in addition to their good adhesion on the base layer, are also very hard and therefore protect the soft base layer from mechanical damage.

It is indeed possible to apply the mentioned mixed layer in thicknesses of many $\mu$, but this is in most cases not necessary, as subsequently even pure inorganic layers adhere well to the mixed layers.

Such single or combined layers are particularly of interest when employed as mechanical and as chemical protection. The latter is of interest not only with synthetic materials, where for example, the diffusion capabilities for different substances may be influenced, but also as protection against corrosion for sensitive inorganic substances. As example may serve certain optical glasses, which are extremely sensitive to acids and moisture.

The indicated possibilities of utilization of the layers in accordance with the invention will doubtless be still more greatly expanded upon intensive study.

Particularly to be considered is the utilization, already mentioned, of the produced layers as adhesion-imparter.

It was now discovered that substances which under ordinary conditions do not easily, or not at all polymerize, such as CO, methane, propane, acetylene, also have a surprisingly favorable effect as adhesion imparters.

It appears that with the vaporization at high vacuum on account of the active non-saturated structure of the newly formed layers, a stable assembly connected with strong gettering occurs also of such molecules as otherwise must be considered less or only moderately apt for reaction. For what reasons this assembly of organic substances, insofar as it is sufficiently strong, improves the adherence so surprisingly, is still not convincingly theoretically explainable.

In any case, it was determined that almost all previously tested organic substances with low molecular weight, insofar as their quantity in the gas chamber exceeds a certain lower limit, revealed an appreciable improvement in the quality of adherence of the vaporized layer on the synthetic material.

On account of the strong gettering, the definition of this lower limit presents certain difficulties. The customary definition of the vapor pressure, upon strong condensation in the vicinity of the condensation surface, as is known, loses its sense, as the term vapor pressure has as prerequisite a statistically irregular directional distribution, which upon strong gettering is no longer present. Therefore the added quantity is expressed by indicating how high the total pressure increases, when the closing of the dosaging valves for the organic substance is discontinued, namely, as long as still no vaporization of the inorganic substance takes place. The measuring then takes place by means of a commercial measuring instrument according to Penning in the scale effective for atmospheric air, and therefore the obtained measured value may be designated as "Penning-torr-equivalent."

As lower limit for a clearly determinable improvement of the adhesion property was found a partial pressure of the organic substance $2.10^{-4}$ Penning-torr equivalent.

The invention consists accordingly in a method for the production of non-metallic inorganic layers adhering well to synthetic materials by means of thermic vaporization of the layer substances in high vacuum, with the characteristic, that in the space between the vaporizer of the inorganic substance and the substrate, vapors of organic combinations ordinarily not polymerizing, are introduced in such quantity, that their partial pressure without getter effect of the vaporizing inorganic substance amounts to at least $2.10^{-4}$ Penning-torr-equivalents.

It is advisable however, to select the quantity of the layer material considerably above the mentioned lower limit, as the adhesiveness increases with the increasing addition of organic substance to an optimum dependent on the rate of vaporization. In order to attain this optimum, one determines at a constant influx of the organic vapor the relationship of the total pressure to the rate of vaporization.

In this connection it has been determined that the total pressure first drops steeply and after passing through a vaguely defined minimum, again slowly increases. This ascending portion of the total pressure characteristic is similar to a fargoing extent to the vapor pressure characteristic without addition of the organic substance and merges asymptotically into the same. From this one can conclude that the gettering action has now been practically completed. The optimum of the adhesiveness lies now in the vicinity of the determined minimum or in any case at a higher value by 0.2 torr.

It is suitable that for a given rate of vaporization of the inorganic vaporization substance, the inflowing quantity of the organic gas or vapor is selected so high, that it is at the break in the total pressure characteristic or up to $2.10^{-4}$ torr and thereabove.

With polymerizable substances, such as methacrylic acid esters, the disadvantage was revealed that these at normal pressure liquid substances with their strong inclination toward polymerization are apt to gradually clog the valves so that the latter could no longer be calibrated. It was now found that thise disturbing behavior was completely eliminated, when the organic combination utilized is already in a gaseous form at normal pressure and room temperature. In this connection it does not need to be a question of a unitary substance, but one may also use a mixture of different substances.

If, as mentioned, such slow-reacting substances as Co, $CH_4$, $C_2H_5$ already provide an appreciable increase in the adhesiveness, it was also discovered that an amplification of this effect occurs in the presence of double-triple-combinations. Thus, very good effects resulted if the organic combination consists of acetylene and/or ethene and/or propene and/or allene.

While with some of the mentioned substances now and then on account of grounds not sufficiently explainable, certain disturbances occur, for example a gray coating capable of being wiped off, butadiene was found to be absolutely reliable. Also with substances such as methyl alcohol, ethyl alcohol, methyl-ether or ethyl ether, an improvement in the adhesiveness was attained. More effective are, however, aldehydes and ketones with 1–4 carbon atoms, particularly formaldehyde. The organic substance may also contain other elements besides C, O and H, for example halogen. As they, however, showed no particular advantages as compared with the previously mentioned combinations, but not infrequently damaged the apparatus by corrosion, a detailed description will be refrained from here.

FIG. 2 illustrates the rate of vaporization $v$ (A./sec.) in dependence on the total pressure $p$ in $10^{-4}$ torr-units. It deals with the gettering of butadiene upon the vaporization of vaporizing glass with the electron gun.

In FIG. 3 the substrate consists of a synthetic material plate, and the organic substances utilized are butadiene. The synthetic material plate is first cleansed with water and an ordinary rinsing agent, washed off with distilled water and centrifuged in a centrifuge. After introduction of the test piece 7 in the vacuum bell 4, the evacuation takes place until the pressure has dropped to $1.10^{-4}$. Then the pressure is increased by means of introduction of air so far until at 1 kv. a glow-current of 50 ma./20 cm. $\phi$ is produced. The glow discharge lasts for 5 minutes; subsequently the pressure is again lowered to $1.10^{-4}$ torr, and the valve for the butadiene is opened so long until the Penning-instrument shows $6.10^{-4}$ torr.

Hereupon, by means of the electron gun 8 a special glass poor in alkali is brought to vaporization and the rate of vaporization is so regulated, that the total pressure passes through a minimum value. One adjusts to the minimal value and then the diaphragm is opened. The vaporization is maintained until on the substrate a layer thickness of $3\mu$ has been deposited, which in known manner may be indicated by optical devices. Subsequently, without interrupting the glass vaporization, the supply of butadiene is cut off and $1\mu$ of pure glass is deposited by evaporation. Directly thereupon air is admitted into vessel 4 and the finished test pieces are removed.

What we claim is:

1. A method of producing upon a substrate a strongly adhering protective coating, comprising the steps of—
    (a) entering said substrate into a vacuum chamber,
    (b) vaporizing a polymerizable organic substance selected from the group consisting of monomers and low-value polymers, and having a vapor pressure in excess of 0.1 torr at room temperature,
    (c) introducing the vapors of said organic substance into said vacuum chamber at such a rate as to maintain therein a partial pressure of said vapors of between $10^{-4}$ and $10^{-2}$ torr,
    (d) causing vaporization in said vacuum chamber of an inorganic non-metallic substance capable of producing upon precipitation on said substrate with said organic substance a gettering effect, and
    (e) discontinuing said precipitation when the mixed layer of said organic and inorganic substances on said substrate amounts to a very few $\mu$m. in thickness.

2. The method according to claim 1, in which said inorganic substance is vaporized by heating.

3. The method according to claim 1, in which said inorganic substance is vaporized by electron bombardment.

4. The method according to claim 1, in which said inorganic substance is vaporized by sputtering.

5. The method according to claim 1, in which said vaporized organic substance is introduced into the vacuum chamber from a separate container through a connecting conduit provided for controlled throttling with a calibrated adjustment valve.

6. The method according to claim 1, in which the vaporization of said polymerizable organic substance is effected by heating within said vacuum chamber.

7. The method according to claim 1, in which said polymerizable organic substance is selected from the group consisting of methylmethacrylic acid ester and styrene.

8. The method according to claim 1, in which said inorganic substance is a difficultly soluble non-metal.

9. The method according to claim 1, in which said inorganic substance is selected from the group consisting of $SiO_2$ and its combination compounds.

10. The method according to claim 1, including the step of adding a polymerization promoting catalyst to the organic vapor.

11. Thee method according to claim 1, including the step of utilizing said mixed coating as an adhesive layer for an inorganic coating of synthetic material.

12. The method according to claim 11, in which said mixed layer contains at least 50% by volume of said inorganic substance.

13. Method according to claim 1, in which for a given rate of vaporization of the inorganic vaporization substance, the inflowing quantity of the organic vapor is selected so high that it will be located beyond the breaking-point of the total pressure characteristic up to $2.10^{-4}$ torr.

14. Method according to claim 1, in which an organic combination is employed, which at room temperature is gaseous.

15. Method according to claim 1, in which a mixture of different organic substances is employed.

16. Method according to claim 14, in which as organic combinations are chosen selectively acetylene, ethene, propene and allene.

17. Method according to claim 14, in which the organic combination consists of butadiene.

18. Method according to claim 1, in which the organic substance consists of an aldehyde with 1–4 carbon atoms.

19. The method according to claim 1, in which said polymerizable organic substance is selected from the group consisting of butadiene, methyl alcohol, ethyl alcohol, methyl ether, ethyl ether, and aldehydes and ketones with 1 to 4 carbon atoms.

20. The method according to claim 1, in which said precipitation is discontinued before the mixed layer of said organic and inorganic substances on said substrate reaches a thickness that is on the order of 3 $\mu$m.

References Cited

UNITED STATES PATENTS

| | | | |
|---|---|---|---|
| 3,272,645 | 9/1966 | Duhoo et al. | 117—33 |
| 3,522,080 | 7/1970 | Dietzel et al. | 117—106 R X |
| 3,520,714 | 7/1970 | Miller | 117—106 R X |
| 2,932,591 | 4/1960 | Goodman | 117—106 R X |
| 3,476,577 | 11/1969 | Davie | 117—33 |
| 2,992,137 | 7/1961 | Bunge et al. | 117—33 X |
| 3,252,830 | 5/1966 | Cummin et al. | 117—106 X |
| 3,301,707 | 1/1967 | Loeb et al. | 117—106 X |
| 3,498,835 | 3/1970 | Chiang et al. | 117—106 X |

RALPH S. KENDALL, Primary Examiner

K. P. GLYNN, Assistant Examiner

U.S. Cl. X.R.

117—33, 67